United States Patent [19]

Reichert et al.

[11] 4,206,298

[45] Jun. 3, 1980

[54] POLYVINYL CHLORIDE MOLDING COMPOSITIONS AND PROCESS FOR MAKING SAME

[75] Inventors: Karl-Heinz Reichert, Krailling; Heiner Zimmermann, Hofheim; Wolf-Dieter Mitterberger, Burgkirchen; Rolf Kränzle, Burgkirchen; Kasimir Ruchlak, Burgkirchen, all of Fed. Rep. of Germany

[73] Assignee: Hoechst Aktiengesellschaft, Fed. Rep. of Germany

[21] Appl. No.: 869,960

[22] Filed: Jan. 16, 1978

Related U.S. Application Data

[63] Continuation of Ser. No. 609,048, Aug. 29, 1975, abandoned, which is a continuation-in-part of Ser. No. 446,818, Feb. 28, 1974, abandoned.

[51] Int. Cl.² ............................. C08F 2/30; C08J 9/24
[52] U.S. Cl. ................................... 526/200; 204/296; 260/29.6 MQ; 526/209; 526/210; 526/225; 526/344.3; 521/65

[58] Field of Search ................. 526/200, 210, 225; 260/2.5 M; 526/209

[56] References Cited

U.S. PATENT DOCUMENTS

| | | | |
|---|---|---|---|
| 2,743,263 | 4/1956 | Coover, Jr. | 526/225 X |
| 3,423,353 | 1/1969 | Levine | 526/225 X |
| 3,553,184 | 1/1971 | Lederer | 526/200 |
| 3,951,883 | 4/1976 | Ruchlak | 260/2.5 M |

FOREIGN PATENT DOCUMENTS 2127654 12/1971 Fed. Rep. of Germany ........... 526/225

*Primary Examiner*—C. A. Henderson
*Attorney, Agent, or Firm*—Connolly and Hutz

[57] ABSTRACT

Pulverulent polyvinyl chloride molding compositions capable of being sintered are produced by polymerizing vinyl chloride in suspension using suspension stabilizers and non ionic wetting agents and as emulsifier alkylaryl- and/or alkyl sulfonic acids. The molding compositions are especially suitable for making separating plates for electric cells.

4 Claims, 2 Drawing Figures

Fig.1.
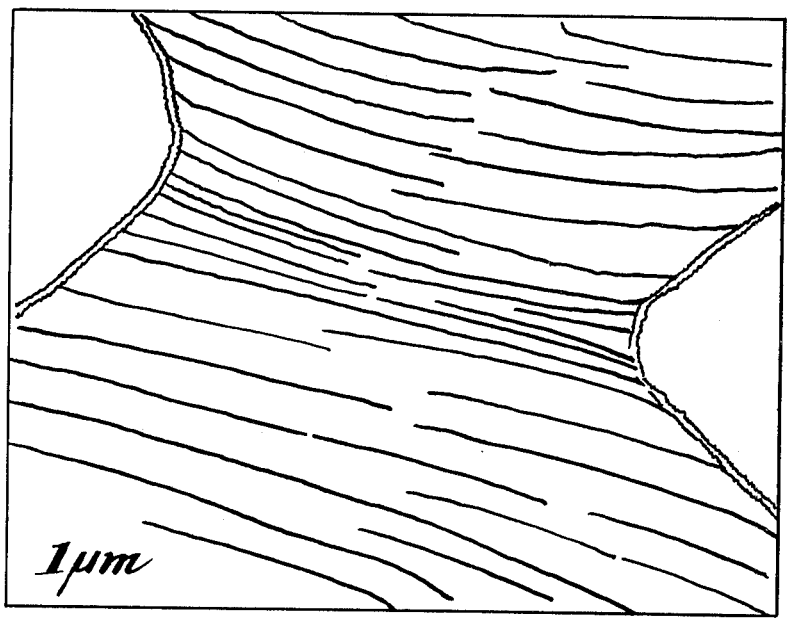
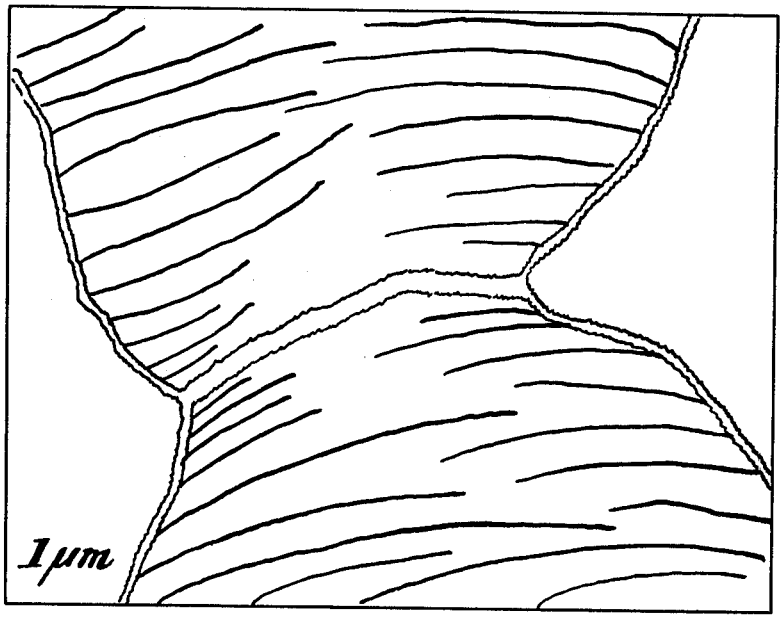
Fig.2.

POLYVINYL CHLORIDE MOLDING COMPOSITIONS AND PROCESS FOR MAKING SAME

This application is a continuation of application Ser. No. 609,048 filed Aug. 29, 1975, now abandoned, which is a continuation-in-part of application Ser. No. 446,818 filed Feb. 28, 1974, now abandoned.

The present invention relates to molding compositions based on pulverulent suspension polyvinyl chloride capable of being sintered, to a process for making same and to the use of the said molding compositions for the manufacture of separating plates for accumulators.

Polyvinyl chloride is used for the manufacture of separating plates in batteries. At first, attempts were made to use products for this purpose which had been prepared according to common processes by polymerizing vinyl chloride in suspension. In general, however, vinyl chloride suspension polymers of this type have too large an average particle size so that the sintered plates made therewith have coarse pores. Moreover, even pulverulent suspension material has the drawback of being difficult to wet, which property hinders the passage of the electrolyte.

In German Offenlegungsschrift No. 2,127,654 it has, therefore, been proposed to prepare a suspension polymer in the presence of known suspension stabilizers, such as alkyl and hydroxyalkyl cellulose, and in the presence of known emulsifying salts, for example alkali metal salts of alkyl sulfates, alkylbenzene sulfonates or dialkyl-sulfosuccinic esters while further adding non-ionic agents, for example block copolymers or condensation products of alkylene oxides. In this manner the wetting properties can be improved but the vinyl chloride suspension polymer obtained is little suitable alone as separator material because of its poor processing properties (when applied by a doctor blade or during rolling). Furthermore, the mechanical properties, especially elongation at break and tensile strength are rather unsatisfactory. In German Offenlegungsschrift No. 2,127,654, therefore, it has been proposed to blend a suspension polymer obtained in this manner with 5 to 50% by weight of a usual emulsion polyvinyl chloride, whereby molding compositions having better sintering properties are obtained. In this manner the processing properties and the wettability are improved, but the mechanical properties of the sintered plates made with the material are further reduced. In addition, owing to the high emulsifier content the separating plates made with such a molding compositions tend to bring about foaming in the accumulator.

All the aforesaid disadvantages can be avoided by using a vinyl chloride suspension polymer in the production of which, besides the usual suspension stabilizers and non ionic wetting agents, free acids are used as emulsifier instead of the salts.

It is, therefore, the object of the present invention to provide a pulverulent molding composition capable of being sintered of a suspension polyvinyl chloride having a K value of from 60 to 75, an apparent density of 350 to 500 g/l, a plasticizer absorption of 12 to 25% by weight, an average particle size of 15 to 35 microns and a particle size distribution of from 60 to 98% by weight smaller than 33 microns,
2 to 35% by weight of from 33 to 63 microns
0 to 4.5% by weight of from 63 to 125 microns and
0 to 0.5% by weight greater than 125 microns, said polyvinyl chloride being produced by suspension polymerization of vinyl chloride in aqueous phase using an oil-soluble activator, in the presence of a suspension stabilizer, a non ionic wetting agent and an emulsifier, separating and drying, said emulsifier being an alkylarylsulfonic acid having from 3 to 16 carbon atoms in the alkyl chain or an alkyl sulfonic acid having 8 to 16 carbon atoms or a mixture of the said sulfonic acids, the said sulfonic acids being used in an amount of from 0.01 to 0.5% by weight, calculated on monomeric vinyl chloride.

It is a further object of the present invention to provide a process for the manufacture of a pulverulent polyvinyl chloride molding composition capable of being sintered by suspension polymerization of vinyl chloride in aqueous phase using an oil-soluble activator, in the presence of a non ionic wetting agent and an emulsifier, with separation and drying of the polymer, which comprises using as emulsifier an alkylarylsulfonic acid having from 3 to 16 carbon atoms in the alkyl chain or an alkylsulfonic acid having from 8 to 16 carbon atoms, or a mixture of the said sulfonic acids, in an amount of from 0.01 to 0.5% by weight, calculated on monomeric vinyl chloride.

Another object of the present invention is the use of the pulverulent molding composition capable of being sintered on the basis of suspension polyvinyl chloride for the manufacture of separating plates for accumulators.

Still another object of this invention is a separating plate for accumulators made from the said molding composition and having a tensile strength of from 80 to 150 kg/cm$^2$, an elongation at break of 6 to 11%, a water absorption of from 40 to 100% and a capillary rise of 120 to 180 mm in a 0.5 mm thick plate.

Suitable alkylarylsulfonic acids are dialkylarylsulfonic acids, for example of naphthalene or benzene, preferably, however, monoalkylarylsulfonic acids, particularly the monoalkylbenzene-sulfonic acids. The alkyl groups contain from 3 to 16, preferably from 8 to 14, and more preferably from 10 to 12 carbon atoms in a branched or straight chain, preferably in a straight chain. Sulfonic acids of this type are, for example, dodecyl- and nonyl-benzene-sulfonic acids, diisobutyl-, diisopropyl-, and di-tert.butyl-naphthalene-sulfonic acids. The alkylsulfonic acids have from 8 to 16 and preferably 12 to 14 carbon atoms.

The sulfonic acids are used either in pure form or in the form of mixtures with one another. The alkylarylsulfonic acids are obtained especially by direct sulfonation of the corresponding alkylbenzenes or mixtures of said alkylbenzenes with SO$_3$ or oleum. The alkylsulfonic acids can be prepared, for example, by sulfoxidation with SO$_2$/O$_2$ of corresponding crude oil or paraffin fractions. The sulfonic acids are used in an amount of from 0.01 to 0.5% by weight, preferably 0.08 to 0.3% by weight, calculated on monomeric vinyl chloride.

Suitable polymerization initiators or activators are the usual oil soluble compounds, for example lauroyl peroxide, diisopropyl-peroxydicarbonate, or cyclohexyl-sulfonylacetyl-peroxide.

The polymerization is carried out in the presence of suitable known suspension stabilizers, such as alkyl or hydroxyalkyl celluloses, for example methyl or ethyl cellulose, hydroxyethyl or hydroxypropyl cellulose, or the mixed ethers thereof, for example hydroxypropylmethyl cellulose. Other suspension stabilizers may also be used, for example polyvinyl alcohol or partially saponified polyvinyl esters. The suspension stabilizers are added to the polymerization mixture in an amount of from 0.05 to 0.8% by weight, preferably 0.1 to 0.5% by weight, calculated on monomeric vinyl chloride. The added suspension stabilizers should have a viscosity of from 200 to 700 centipoises, preferably 300 to 500 centipoises, calculated on a 2% by weight solution at 20° C.

The non ionic wetting agent is used in an amount of from 0.01 to 0.1% by weight, preferably 0.01 to 0.05% by weight, calculated on monomeric vinyl chloride. Suitable wetting agents are the common ones, for example, sorbitan fatty acid esters, polyoxyethylene sorbitan fatty acid esters, as well as polymers and copolymers of alkylene oxides, for example ethylene or propylene oxide and the alkyl and aryl ethers and asters or propylene oxide and the alkyl and aryl ethers and esters thereof.

The suspension stabilizers, emulsifiers and non ionic wetting agents are added to the polymerization mixture prior to the beginning of polymerization. It is also possible, however, to meter in continuously or in portions partial amounts of the said auxiliaries (one or several) of at most 50% after the beginning of polymerization.

It is important that the polymerization is carried out in a medium substantially free of salts or electrolytes. Especially no salts or electrolytes should be added to the polymerization mixture. If the polymerization auxiliaries, e.g. suspension stabilizers, initiators or non ionic wetting agents contain traces of salts or electrolytes as contamination the amounts thereof should not be higher than 50 ppm, preferably 30 ppm, calculated on monomeric vinylchloride.

The suspension polymerization of vinyl chloride is effected in the usual temperature range of from 50° to 70° C. according to the common charge technique.

The suspension polymers obtained shall have K values of from 60 to 75, preferably 65 to 70. They are worked up in known manner by centrifugation and drying with hot air.

The process of the invention yields products having an optimum average particle diameter for sintering of from 15 to 35 microns, preferably 15 to 25 microns, determined by sedimentation analysis. The average particle size distribution, measured by air jet screening, was found to be as follows:

60 to 98% smaller than 33 microns
2 to 35% of from 33 to 63 microns
0 to 4.5% of from 63 to 125 microns and
0 to 0.5% larger than 125 microns.

The polymer has an apparent density of from 350 to 500 g/l, preferably 400 to 450 g/l, its plasticizer absorption is in the range of from 12 to 25%, preferably 15 to 20%.

The improved sintering properties of the molding compositions according to the invention were tested as follows:

With the use of the n-dodecylbenzene-sulfonic acid as emulsifier in the sintering process the particles of the polymer of the invention weld together homogeneously as illustrated in the accompanying FIG. 1 of the drawing, whereas with a suspension polymer produced with an alkali metal salt emulsifier, for example sodium n-dodecylbenzene-sulfonate a distinct seam is observed along the line of weld as shown in FIG. 2 of the drawing. Separator plates made from the molding compositions of the invention by the usual band sintering have a smooth surface, very fine pores and a sufficient porosity for the electrolyte passage (determined by measuring the water absorption according to DIN 51,056). As compared with plates of known molding compositions the mechanical properties, above all the elongation at break and the tensile strength, are greatly improved. Nevertheless, they do not show any processing difficulties, they can be readily applied on the band and do not tend to form a deposit on the roll. The separator plates made with the composition of the invention have good wetting properties and foaming does not occur when the battery is charged.

The sintered plates made from the compositions of the invention have the following properties, measured with a plate having a thickness of 0.5 mm:

tensile strength 80 to 150 kg/cm$^2$, preferably 90 to 130 kg/cm$^2$
elongation at break 6 to 11%, preferably 6.5 to 9%
water absorption 40 to 100%, preferably 50 to 80% by weight
capillary rise 120 to 180 mm, preferably 140 to 160 mm.

The pulverulent molding compositions of suspension polyvinyl chloride according to the invention are well suitable for sintering and for this purpose they need not be blended with other components, for example emulsion polymers. Owing to their excellent mechanical and electrical properties and sintering behavior they are preferably used for the manufacture of separating plates in electric cells, especially accumulators. They are also suitable, however, for other applications for which a sinterable porous plastic material is preferred, for example for making filling bodies for cooling or trickling towers, for filters, for the manufacture of insulating material or as porous masses for ion exchangers, water evaporators on radiators, for flower pots, and the like.

To characterize the pulverulent molding compositions capable of being sintered of the invention of suspension polyvinyl chloride, the following measuring methods were used:

The apparent density was determined according to DIN 53,468.

To measure the plasticizer absorption a filter paper impregnated with di-2-ethylhexyl phthalate (dioctylphthalate DOP) was tightly placed on the perforated inner bottom of a centrifuge beaker insert (laboratory centrifuge according to DIN 58,970 E) and the insert with the filter paper was weighed (weight $m_1$). Next 10.0 grams of polymer (weight $m_2$) were weighed into the insert, about 20 grams of DOP were added and the whole was allowed to stand for about 5 minutes. At a centrifuge acceleration at the bottom of the perforated insert of 25,000 to 26,000 m/sec$^2$ centrifugation was performed for 60 minutes. The insert was then wiped at its outer side with filter paper and weighed with contents (weight $m_3$). The plasticizer absorption which, inter alia, is a measurement of the porosity of the polymer grain, is calculated in % by weight according to the formula:

$$(m_3 - m_2)/(m_2 - m_1) \cdot 100$$

The indicated values are average values of 10 individual measurements.

The average particle diameter of the polymer was determined by sedimentation analysis as follows:

1.82 Grams of polyvinyl chloride were dispersed in 600 ml of a 0.09% sodium pyrophosphate solution which had been thoroughly degassed and the settling tendency was measured with a Satorius sedimentation balance type 4,600 at an advance of the recording paper of 120 mm/h. The calculation was made according to the known Stokes' formula and indicates the particle radius.

To determine the particle size distribution the air jet sieve analysis in accordance with DIN draft 53,734 was used.

PREPARATION OF SINTERED PLATES

For this purpose a continuous band sintering device was used. Polyvinyl chloride powder was applied in a determined layer thickness on an endless steel band and for sintering the steel band was passed through a furnace the electric heating of which was adjusted to 350° C. By variation of the band speed the residence time in the sintering zone and hence the degree of sintering of the polyvinyl chloride powder was regulated. The band speed was adjusted to a value of from 2.0 and 2.3 m/min, preferably 2.2 m/min, so that the finished separating plate had a resistance of 1.6 m$\Omega$/dm$^2$. The plates had a thickness of 0.50 mm and ribs of 1.1 mm.

MEASUREMENT OF THE ELONGATION AT BREAK AND TENSILE STRENGTH

In analogy with DIN 53,455—tensile test of plastic materials—the elongation at break and the tensile strength were determined. As no standardized test specimens were available, test bars of the dimensions 60×140 mm were cut from the sintered plates and tested on a tensile tester in accordance with the general conditions for tensile testers (DIN 51,220, class 1 and DIN 51,221) after a storage for 16 hours under normal atmospheric conditions (DIN 50,014/1) at 23±2° C. and 50±5 % of relative humidity. The testing speed, i.e. the speed at which the two clamps retired from each other, was 50 mm/min±10%. The power measurement range was at 100 kg. Force and elongation were recorded on a diagram roll. The advance proportional to elongation (diagram paper: traverse) was adjusted enlarged to 5:1. The elongation was calculated on 100 mm of free length between the clamping points.

MEASUREMENT OF THE ELECTRIC RESISTANCE

To determine the electric resistance of separating plates the so-called inner resistance of cells was determined in a special cell arrangement for this purpose (battery cell). The difference in the cell resistance with and without separating plate indicated the negative resistance of the separating body.

The testing cell consisted of a positive and a negative plate (PbO and Pb) placed parallel to each other at a distance of 7 mm. As electrodes plates having the size and construction as usual in lead accumulators were used. Exactly between the electrodes in a window-like opening of 100×100 mm the separating plate was inserted. The testing cell was filled with sulfuric acid having a density of 1.28 and was completely charged. To measure the low ohmic inner resistance a directly recording micro-ohmmeter (type EMT 326, Messrs. Elektromesstechnik W. Franz KG, Lahr) was connected to both electrodes. The measurement was carried out with alternating current from mains.

MEASUREMENT OF WATER ABSORPTION

As a measurement for the porosity of the separating plates the water absorption according to DIN 51,056 was determined by storing the plates for 24 hours in water of 40° C. and measuring the water absorption by weighing.

MEASUREMENT OF THE CAPILLARY RISE

As a measurement for the wettability of the separating plates and to characterize the porosity a 1 cm wide strip of a plate was placed in a test tube filled with water to a height of 1.5 cm. The capillary rise is the height of wetting in mm after standing in water for 10 minutes.

The following examples illustrate the invention, the parts and percentages being by weight unless otherwise stated. The test values of the respective products and the separating plates made therewith are summarized in Tables 1 and 2.

EXAMPLE 1

A mixture consisting of
440 parts of vinyl chloride
870 parts of desalted water
2.2 parts of methyl cellulose (viscosity of 2% solution at 20° C. 400 centipoises)
1.1 parts of n-dodecylbenzenesulfonic acid
0.22 part of polyoxyethylene sorbitan monolaurate
0.088 part of diisopropyl peroxydicarbonate
was polymerized for 7 hours at 59° C. in a 1,500 liter vessel of VA steel at a stirring speed of 150 revolutions per minute. The fine-grained polymer sludge obtained was centrifuged on a decanter and the moist material was dried with hot air in a current drier (inlet temperature 150° C., outlet temperature 85° C.).

EXAMPLE 2

A mixture consisting of
440 parts of vinyl chloride
870 parts of desalted water
1.32 parts of methyl cellulose (viscosity of 2% solution at 20° C. 400 centipoises)
0.66 part of n-dodecylbenzenesulfonic acid
0.13 part of polyoxyethylene sorbitan monolaurate
0.088 part of diisopropyl peroxydicarbonate
was polymerized and the polymer dried under the conditions specified in Example 1.

EXAMPLE 3

A mixture consisting of
440 parts of vinyl chloride
870 parts of desalted water
2.2 parts of methyl cellulose (viscosity of 2% solution at 20° C. 400 centipoises)
1.1 parts of n-alkane-sulfonic acid with 12 to 16 carbon atoms in the carbon chain on the average, with a preponderant proportion of $C_{14}$
0.22 part of polyoxyethylene sorbitan monolaurate
0.088 part of diisopropyl peroxydicarbonate
was polymerized and the polymer dried under the conditions specified in Example 1.

COMPARATIVE EXAMPLE

A mixture consisting of
440 parts of vinyl chloride
870 parts of desalted water
2.2 parts of methyl cellulose (viscosity of 2% solution at 20° C. 400 centipoises)
1.1 parts of the sodium salt of n-dodecylbenzenesulfonic acid
0.22 part of polyoxyethylene sorbitan monolaurate 0.088 part of diisopropyl peroxydicarbonate was polymerized and the polymer dried under the conditions of Example 1.

The properties of the suspension polymers obtained are summarized in the following Table 1.

Table 1

| properties | Examples | | | comparison |
| --- | --- | --- | --- | --- |
|  | 1 | 2 | 3 |  |
| K value | 68.0 | 66.3 | 64.9 | 68.8 |
| apparent density (g/l) | 420 | 480 | 470 | 400 |
| plasticizer absorption (DOP %) | 15 | 14 | 15 | 18 |
| average particle diameter (micron) | 21 | 25 | 23 | 21 |
| sieve analysis % | | | | |
| <33μ | 95.0 | 73.9 | 87.5 | 96.0 |
| >33μ <63μ | 4.0 | 24.1 | 12.0 | 3.0 |
| >63μ <125μ | 0.8 | 1.6 | 0.4 | 0.8 |
| >125μ | 0.2 | 0.4 | 0.1 | 0.2 |

The properties of separating plates produced with the polymers obtained are summarized in the following Table 2.

Table 2

| | Examples | | | comparison |
| --- | --- | --- | --- | --- |
|  | 1 | 2 | 3 |  |
| elongation at break % average of 4 measurements | 9 | 6.5 | 7.8 | 2.6 |
| tensile strength kg/cm² average of 4 measurements | 130 | 130 | 105 | 65 |
| water absorption % by weight | 58 | 55 | 60 | 55 |
| capillary rise mm | 150 | 145 | 160 | 140 |
| electric resistance mΩ/dm² with 0.5 mm thick plates | 1.6 | 1.6 | 1.6 | 1.6 |

What is claimed is:

1. A process for making a pulverulent molding composition capable of being sintered of suspension polyvinyl chloride by polymerizing vinyl chloride in suspension in aqueous phase using an oil soluble activator in the presence of from 0.05 to 0.8 percent by weight as suspension stabilizer of an alkyl cellulose, a hydroxylalkyl cellulose or an alkyl hydroxyalkyl cellulose, from 0.01 to 0.1 percent by weight of a sorbitan fatty acid ester, a polyoxyethylene sorbitan fatty acid ester, or a polymer of an alkylene oxide or of an alkyl- or an aryl ether of an alkylene oxide or of an alkyl- or an aryl ester of an alkylene oxide and an emulsifier, separating and drying the polymer without applying any additional emulsifier to the polymer after its separation, which comprises using as emulsifier of from 0.01 to 0.5 percent by weight of a monoalkylbenzene sulfonic acid having from 8 to 14 carbon atoms in the alkyl chain, or an n-alkylsulfonic acid having from 8 to 16 carbon atoms, or a mixture of the said sulfonic acids, wherein all percentages are based on monomeric vinyl chloride.

2. The process of claim 1, wherein of from 0.08 to 0.3% by weight of emulsifier is used.

3. The process of claim 1, wherein the suspension stabilizer, non ionic wetting agent and emulsifier are added to the polymerization mixture prior to the beginning of polymerization.

4. The process of claim 1, wherein partial amounts of at most 50% of suspension stabilizer, non ionic wetting agent and emulsifier are added to the polymerization mixture after the beginning of polymerization.

* * * * *